US010726991B2

(12) United States Patent
Naruse et al.

(10) Patent No.: US 10,726,991 B2
(45) Date of Patent: Jul. 28, 2020

(54) COIL UNIT FOR CONTACTLESS POWER SUPPLY

(71) Applicant: NISSAN MOTOR CO., LTD., Yokohama-shi, Kanagawa (JP)

(72) Inventors: Yuji Naruse, Kanagawa (JP); Yusuke Minagawa, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 16/301,861

(22) PCT Filed: May 18, 2016

(86) PCT No.: PCT/JP2016/064713
§ 371 (c)(1),
(2) Date: Nov. 15, 2018

(87) PCT Pub. No.: WO2017/199361
PCT Pub. Date: Nov. 23, 2017

(65) Prior Publication Data
US 2019/0148065 A1  May 16, 2019

(51) Int. Cl.
| | | |
|---|---|---|
| H01F 38/14 | (2006.01) | |
| H02J 50/10 | (2016.01) | |
| H02J 50/80 | (2016.01) | |
| H01F 3/14 | (2006.01) | |
| B60L 53/12 | (2019.01) | |
| H01F 5/00 | (2006.01) | |

(Continued)

(52) U.S. Cl.
CPC .............. *H01F 38/14* (2013.01); *B60L 53/12* (2019.02); *H01F 3/14* (2013.01); *H01F 5/00* (2013.01); *H01F 27/2871* (2013.01); *H01F 27/365* (2013.01); *H02J 50/10* (2016.02); *H02J 50/80* (2016.02); *H02J 7/025* (2013.01)

(58) Field of Classification Search
CPC .......... H01F 38/14; H01F 5/00; H01F 27/365; H01F 3/14; H01F 27/2871; B60L 53/12; H02J 50/70; H02J 7/025; H02J 5/005; H02J 50/80; H02J 50/10
See application file for complete search history.

(56) References Cited

U.S. PATENT DOCUMENTS

2008/0129246 A1   6/2008 Morita et al.
2010/0007215 A1*  1/2010 Sakuma .................. H01F 38/14
                                                 307/104

(Continued)

FOREIGN PATENT DOCUMENTS

JP    2008-120239 A    5/2008
JP    2010-041906 A    2/2010
(Continued)

*Primary Examiner* — Jared Fureman
*Assistant Examiner* — Michael J Warmflash
(74) *Attorney, Agent, or Firm* — Foley & Lardner LLP

(57) ABSTRACT

A coil unit includes a coil formed of a conducting wire arranged on a first plane and laid side by side with itself in an inside-outside direction with a coil axis normal to the first plane as the center, and a plurality of magnetic plates arranged on a second plane which is along and adjacent to the first plane. A gap which is formed by the magnetic plates and traverses the inside-outside direction of the coil is located near an edge portion of the coil in the inside-outside direction.

14 Claims, 13 Drawing Sheets

(51) Int. Cl.
    *H01F 27/28*    (2006.01)
    *H01F 27/36*    (2006.01)
    *H02J 7/02*     (2016.01)

(56) References Cited

U.S. PATENT DOCUMENTS

2015/0279554 A1   10/2015   Ryoson et al.
2016/0012967 A1   1/2016    Kurs et al.

FOREIGN PATENT DOCUMENTS

| JP | 2014-078847 A | | 5/2014 |
| JP | 2014-239168 A | | 12/2014 |
| JP | 2014239168 A | * | 12/2014 |
| JP | 2015-088668 A | | 5/2015 |
| JP | 2015-233357 A | | 12/2015 |
| WO | WO-2013/133254 A1 | | 9/2013 |
| WO | WO-2015/064239 A1 | | 5/2015 |

\* cited by examiner

COIL UNIT FOR CONTACTLESS POWER SUPPLY

TECHNICAL FIELD

The present invention relates to a coil unit for use for contactless power supply.

BACKGROUND ART

There has been proposed a technique concerning a coil unit for use for contactless power supply, in which a plurality of magnetic plates for increasing the directionality of magnetic flux are disposed adjacent to a substantially plate-shaped coil (see Patent Literature 1).

CITATION LIST

Patent Literature

Patent Literature 1: Japanese Patent Application Publication No. 2015-233357

SUMMARY OF INVENTION

Technical Problem

In the technique described in Patent Literature 1, however, when the magnetic flux is increased in order to transmit more power, more magnetic plates are needed in the inside-outside direction of the coil as well. When a gap between the magnetic plates is formed to traverse electric lines of force produced by the coil, dielectric breakdown may occur in the gap between the magnetic plates depending on the position of the gap.

The present invention has been made in view of the above problem, and aims to provide a coil unit capable of reducing the possibility of dielectric breakdown between the magnetic plates.

Solution to Problem

A coil unit according to an aspect of the present invention includes a coil formed of a conducting wire arranged on a first plane and laid side by side with itself, and a plurality of magnetic plates arranged on a second plane which is along and adjacent to the first plane, and a gap which is formed by the magnetic plates and traverses a direction in which the coil is laid side by side is located near an edge portion of the coil in a direction in which the conducting wire is laid side by side.

Advantageous Effects of Invention

An aspect of the present invention can provide a coil unit capable of reducing the potential difference between the magnetic plates and lowering the risk of dielectric breakdown between the magnetic plates, by the formation of the gaps of the magnetic plates at positions with low electric field strength.

DESCRIPTION OF EMBODIMENTS

Figure 1:
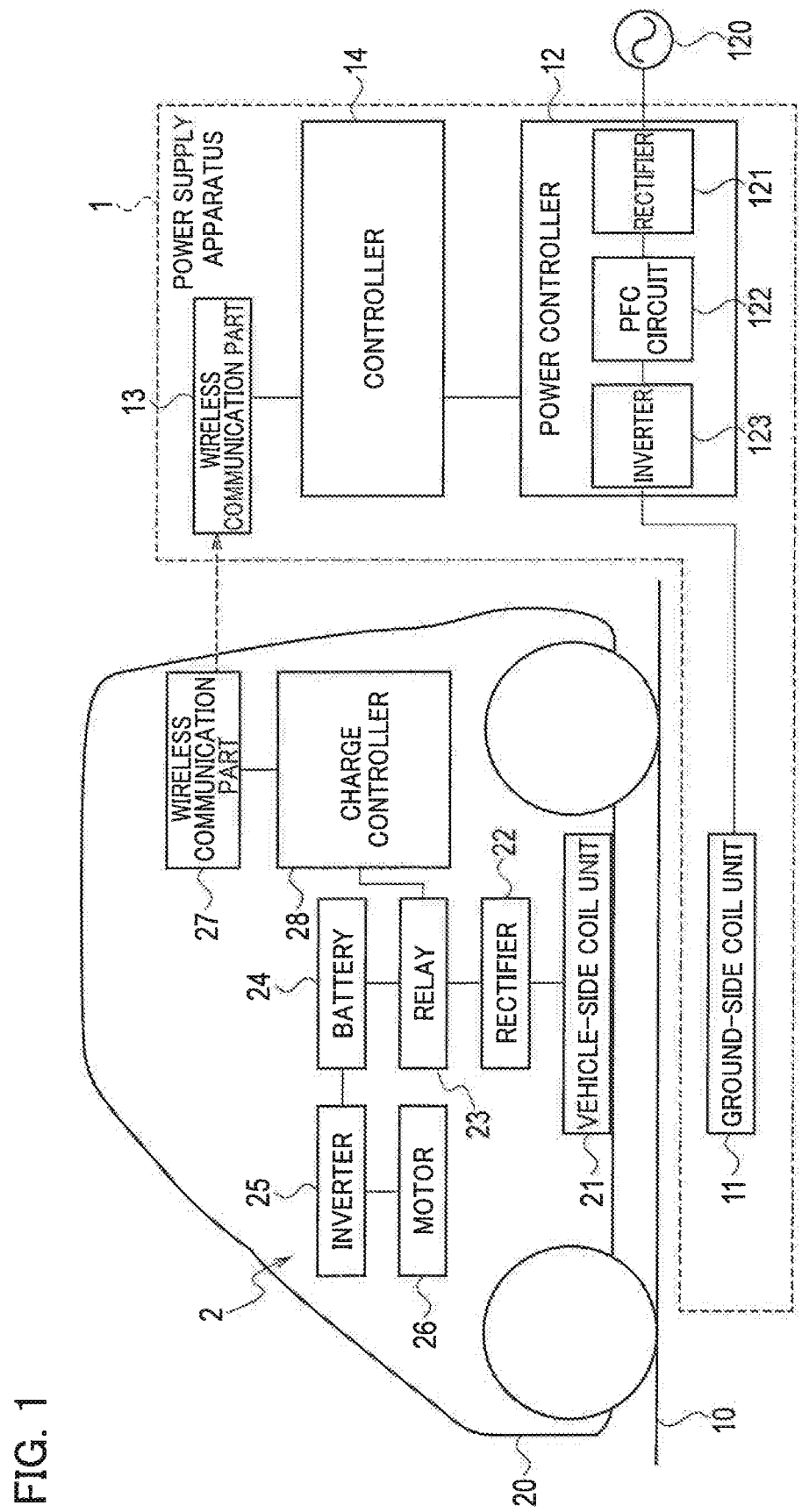
FIG. 1 is a schematic block diagram illustrating the basic configuration of a contactless power supply system including a coil unit according to a first embodiment.

Embodiments of the present invention will be described with reference to the drawings. Throughout the drawings, the same or like portions are denoted by the same or like reference numerals and are not described repeatedly. Note that the drawings are only schematic, and the dimensional relations, ratios, and the like may be different from actual ones.

First Embodiment

A contactless power supply system including a coil unit according to a first embodiment includes, as illustrated in FIG. 1, a power supply apparatus 1 disposed at a power supply stand or the like and a power receiving apparatus 2 installed in a vehicle 20 such as an electric automobile or a hybrid automobile. The power supply apparatus 1 supplies power to the power receiving apparatus 2 in a contactless manner.

The power supply apparatus 1 includes a ground-side coil unit 11, a power controller 12 that controls power to supply to the ground-side coil unit 11, a wireless communication part 13, and a controller 14. The ground-side coil unit 11 is disposed in, for example, a parking space 10 for power supply as the coil unit according to the first embodiment.

The power controller 12 includes a rectifier 121, a power factor improvement (PFC) circuit 122, and an inverter 123. The power controller 12 converts AC power transmitted from an AC power source 120 into high-frequency AC power and transmits the power to the ground-side coil unit 11.

The rectifier 121 is a circuit that rectifies AC power outputted from the AC power source 120. The PFC circuit 122 is a circuit that improves the power factor by shaping the waveform outputted from the rectifier 121. The inverter 123 is a power conversion circuit including a pulse width modulation (PWM) control circuit having a switching element such as an insulated gate bipolar transistor (IGBT). The inverter 123 switches on and off the switching element based on a switching control signal, and thereby converts DC power to AC power and supplies the AC power to the ground-side coil unit 11.

The wireless communication part 13 is a communication device that performs bidirectional communications with the power receiving apparatus 2 as controlled by the controller 14.

The controller 14 is a control circuit that controls the operation of the power supply apparatus 1. Through communications between the wireless communication part 13 and the power receiving apparatus 2, the controller 14 transmits, to the power receiving apparatus 2, a signal notifying of start of power supply from the power supply apparatus 1, and receives, from the power receiving apparatus 2, a signal requesting start of power supply from the power supply apparatus 1. Also, the controller 14 generates a switching control signal and performs switching control of the inverter 123, controlling power to supply to the ground-side coil unit 11.

The power receiving apparatus 2 includes a vehicle-side coil unit 21, a rectifier 22, a relay 23, a battery 24, an inverter 25, a motor 26, a wireless communication part 27, and a charge controller 28.

The vehicle-side coil unit 21 is disposed on the bottom part of the vehicle 20 so as to face the ground-side coil unit 11 with a predetermined distance therebetween when the vehicle 20 is parked properly at a prescribed position in the parking space 10. When power is supplied from the power controller 12 to the ground-side coil unit 11, the vehicle-side coil unit 21 is magnetically coupled with the ground-side coil unit 11, and power is transmitted from the ground-side coil unit 11 to the vehicle-side coil unit 21 in a contactless manner by electromagnetic induction. In other words, the vehicle-side coil unit 21 receives power from the ground-side coil unit 11 in a contactless manner.

The rectifier 22 is a circuit that rectifies AC power received by the vehicle-side coil unit 21 into DC. The relay 23 includes a relay switch that switches on and off as controlled by the charge controller 28. The relay 23 separates the battery 24 side and the rectifier 22 side from each other by switching off the relay switch. The battery 24 is formed by a plurality of secondary batteries connected to one another and is the power source of the vehicle 20.

The inverter 25 is a power conversion circuit including a PWM control circuit having a switching element such as an IGBT. The inverter 25 switches on and off the switching element based on a switching control signal, and thereby converts DC power outputted from the battery 24 to AC power and supplies the AC power to the motor 26 as the driving source of the vehicle 20. The motor 26 is formed of, for example, a three-phase AC motor.

The wireless communication part 27 is a communication device that performs bidirectional communications with the wireless communication part 13 of the power supply apparatus 1 as controlled by the charge controller 28.

The charge controller 28 is a control circuit that controls the operation of the power receiving apparatus 2. The charge controller 28 controls a power receiving operation using the vehicle-side coil unit 21, mainly for charging the battery 24. By transmitting a signal requesting start of power supply to the controller 14 through the wireless communication parts 27, 13, the charge controller 28 causes the power supply apparatus 1 to start power supply from the ground-side coil unit 11. The charge controller 28 controls the rectifier 22 and the relay 23 and thereby supplies power that the vehicle-side coil unit 21 receives from the ground-side coil unit 11 to the battery 24 and charges the battery 24.

—Coil Unit—

Figure 2A:
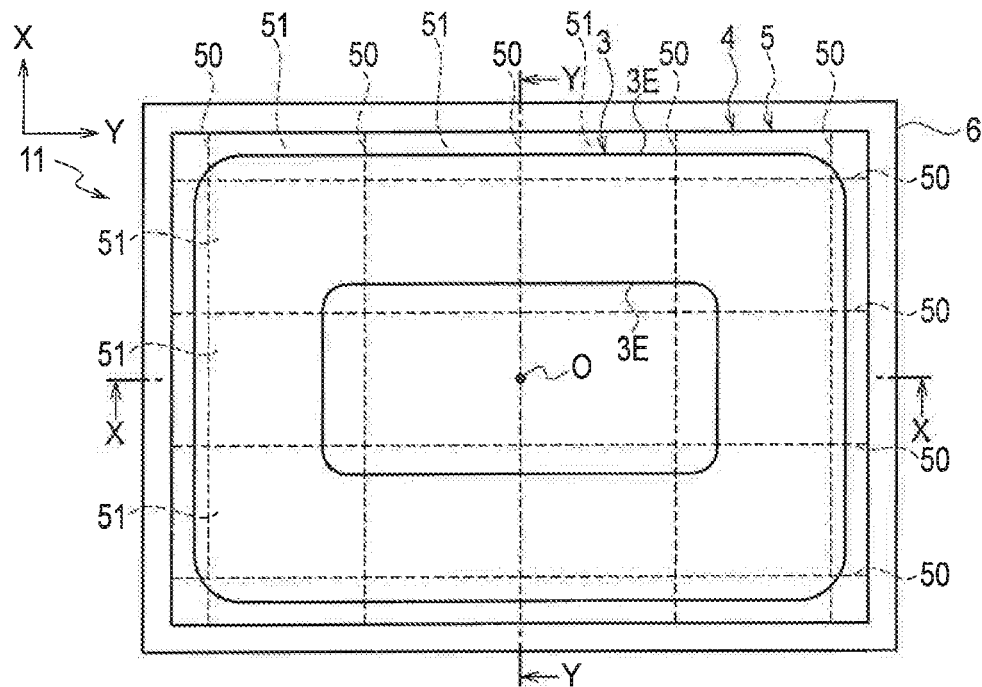
FIG. 2A is a plan view illustrating the coil unit according to the first embodiment.
Figure 2B:
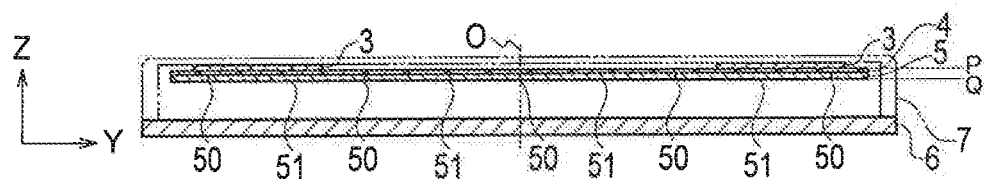
FIG. 2B is a sectional view seen in the direction of X-X in FIG. 2A.
Figure 2C:
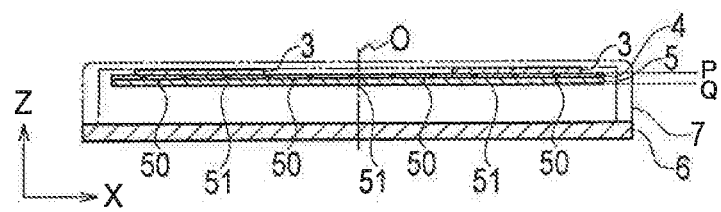
FIG. 2C is a sectional view seen in the direction of Y-Y in FIG. 2A.

As illustrated in FIGS. 2A to 2C, the ground-side coil unit 11, which is the coil unit according to the first embodiment, includes a coil 3 having a coil axis O along a vertical direction, an insulating layer 4, a magnetic core 5, a base plate 6, and a cover 7.

Figure 3A:
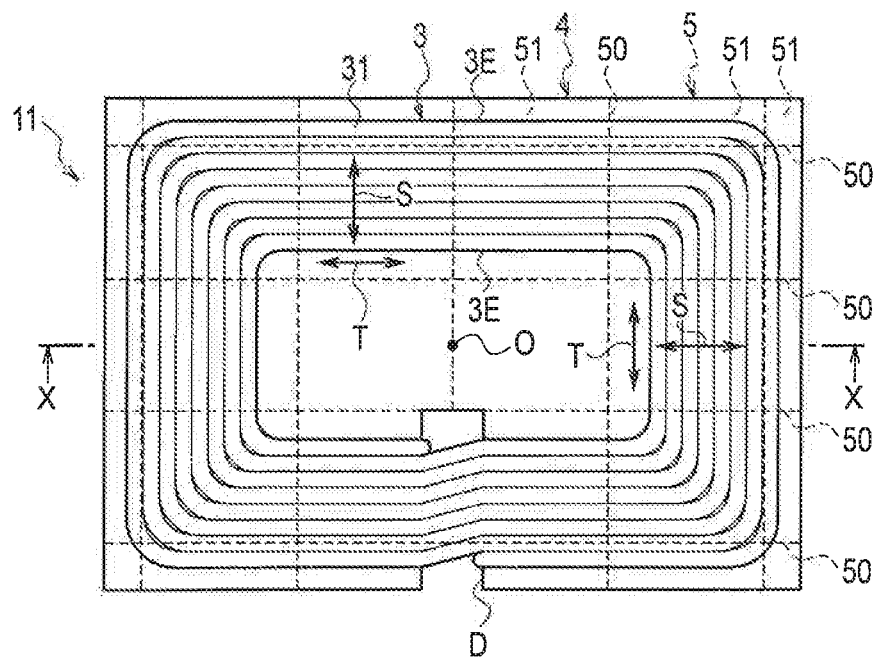
FIG. 3A is a plan view illustrating the coil unit according to the first embodiment.
Figure 3B:
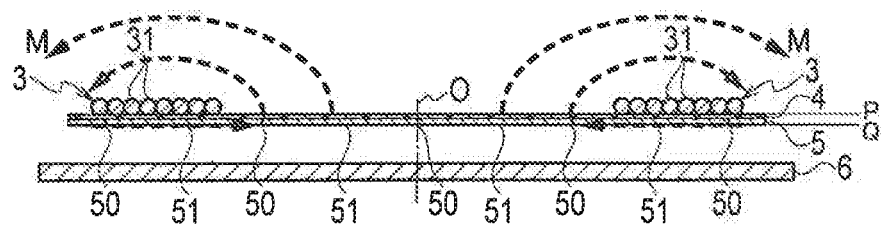
FIG. 3B is a sectional view seen in the direction of X-X in FIG. 3A.

As illustrated in FIGS. 3A and 3B, the coil 3 is formed of a conducting wire 31 arranged on a first plane P and laid side by side with itself in an inside-outside direction S with the coil axis O normal to the first plane P as the center. In other words, the inside-outside direction S is the direction in which the conducting wire 31 is laid side by side with itself. The conducting wire 31 is wound round and round a plurality of times rectangularly in a view along the coil axis O and thus occupies a substantially rectangular annular region. The conducting wire 31 is formed of a litz line or the like.

The magnetic core 5 is formed by a plurality of magnetic plates 51 arranged on a second plane Q adjacent to and along the first plane P. The magnetic core 5 encloses the coil 3 in a view along the coil axis O. The magnetic plates 51 are each shaped like a rectangular plate. For example, the magnetic plates 51 are arranged by covering the bottom plate of a rectangular resin tray (not shown) in a view along the coil axis O (the Z axis direction). As illustrated in FIG. 3B, the magnetic core 5 collects magnetic flux M generated below the coil 3 inside.

The magnetic core 5 supports the coil 3 with the sheet-shaped insulating layer 4 interposed therebetween. The insulating layer 4 insulates the coil 3 and the magnetic core 5 from each other. The insulating layer 4 is made of an insulating material such as a resin. The insulating layer 4 may be a lid of the tray accommodating the magnetic core 5. The insulating layer 4 may be omitted if the conducting wire 31 and the magnetic core 5 can be sufficiently insulated from each other by a coating on the conducting wire 31 or a coating on the magnetic core 5. A region D of the magnetic core 5 and the insulating layer 4 where the conducting wire 31 starts and ends being wound is removed to allow the wire to be drawn out from both ends of the coil 3.

Gaps 50 between adjacent ones of the magnetic plates 51 extend on the second plane Q in two axis directions orthogonal to each other (the X axis direction and the Y axis direction). The magnetic plates 51 are arranged so that the gaps 50 that extend in an extending direction T of the conducting wire 31 may be located near edge portions 3E of the coil 3 in the inside-outside direction S. In other words, the gaps 50 which are formed by the magnetic plates 51 and traverse the inside-outside direction S of the coil 3 are located near the edge portion 3E of the coil 3 in the inside-outside direction S.

The base plate 6 supports the magnetic core 5 with a support member (not shown) interposed therebetween. The base plate 6 is shaped like a rectangular plate and is made of a metallic material such as aluminum. The base plate 6 may function as a heat dissipating plate that dissipates heat produced by the coil 3 and the magnetic core 5. The coil 3, the magnetic core 5, and the like are covered by the cover 7 while being disposed above the base plate 6.

Figure 4A:
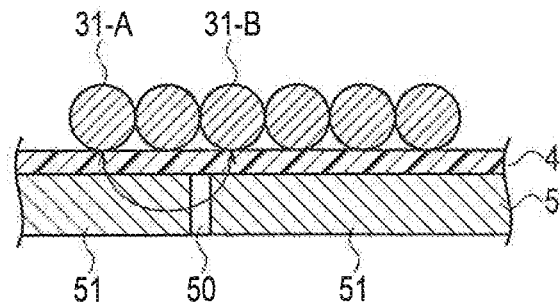
FIG. 4A is an enlarged sectional view of the coil unit seen in the extending direction of a conducting wire, the view illustrating an electric line of force between parts of the conducting wire passing through a gap between the magnetic plates.

Here, a description is given of, as illustrated in FIG. 4A, a potential $v_c$ at the gap 50 located between the A-th lap of the conducting wire 31, namely a conducting wire 31-A, and the B-th lap of the conducting wire 31, namely a conducting wire 31-B, in a view along the coil axis O. When there is a potential difference between both ends of the coil 3, the conducting wire 31 has a different potential at each position. As illustrated in FIG. 4A, an electric line of force between the conducting wire 31-A and the conducting wire 31-B through the gap 50 passes through the insulating layer 4 and the magnetic plate 51 located below the conducting wire 31-A, the gap 50, and the magnetic plate 51 and the insulating layer 4 located below the conducting wire 31-B.

Figure 4B:
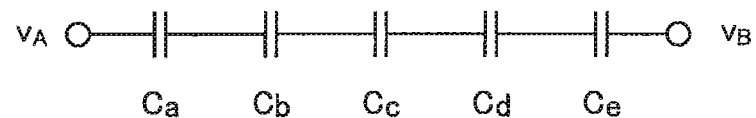
FIG. 4B is an equivalent circuit diagram corresponding to FIG. 4A.

FIG. 4B is an equivalent circuit corresponding to the electric line of force illustrated in FIG. 4A. The equivalent circuit illustrated in FIG. 4B is a serial circuit of a capacitance $C_a$ of the insulating layer 4 located below the conducting wire 31-A, a capacitance $C_b$ of the magnetic plate 51 located below the conducting wire 31-A, a capacitance $C_c$ of the gap 50, a capacitance $C_d$ of the insulating layer 4 located below the conducting wire 31-B, and a capacitance $C_e$ of the magnetic plate 51 located below the conducting wire 31-B. In FIG. 4B, $v_A$ indicates the potential at the conducting wire 31-A, and $v_B$ indicates the potential at the conducting wire 31-B. When the potential difference between $v_A$ and $v_B$ is v, the potential $v_c$ at the gap 50 located between the conducting wire 31-A and the conducting wire 31-B is expressed as Formula (1).

[Math 1]

$$v_c = \frac{v}{C_c\left(\frac{1}{C_a} + \frac{1}{C_b} + \frac{1}{C_c} + \frac{1}{C_d} + \frac{1}{C_e}\right)} \tag{1}$$

An electric field $E_c$ at the gap 50 is expressed as Formula (2) when d is the clearance of the gap 50.

$$E_c = v_c/d \tag{2}$$

Here, a description is given of the electric field $E_c$ at the gap 50 which extends in the extending direction T of the conducting wire 31 and is located in a region overlapping with the coil 3 in a view along the coil axis O. The number of turns of the coil 3 is defined as 2n, and the position of the gap 50 is defined as k. The position k of the gap 50 is 1 when the gap 50 is located between a conducting wire 31-1 of the first lap and a conducting wire 31-2 of the second lap, and is 2 when the gap 50 is located between the conducting wire 31-2 of the second lap and a conducting wire 31-3 of the third lap. In other words, k is N when the gap 50 is located between a conducting wire of the N-th lap and a conducting wire of the (N+1)-th lap.

Figure 5A:
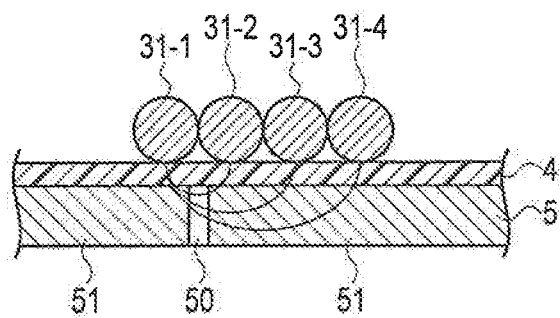
FIG. 5A is a sectional view illustrating an electric field at a gap between magnetic plates in a case where n=2 and k=1.

First, a description is given of the electric field $E_c$ at the gap 50 when n=2 (the number of turns of the coil 3 is four), and k=1, as illustrated in FIG. 5A. As illustrated in FIG. 5A, an electric line of force passing through the gap 50 is generated between the conducting wire 31-1 and each of the other conducting wire parts, i.e., the conducting wire 31-2 to the conducting wire 31-4.

Electric fields at the gap 50, namely an electric field $E_{c12}$ by the conducting wire 31-1 and the conducting wire 31-2, an electric field $E_{c13}$ by the conducting wire 31-1 and the conducting wire 31-3, and an electric field $E_{c14}$ by the conducting wire 31-1 and the conducting wire 31-4, are expressed by Formulae (3) to (5), respectively.

$$E_{c12} = v_{12}K = K\Delta v \tag{3}$$

$$E_{c13} = v_{13}K = 2K\Delta v \tag{4}$$

$$E_{c14} = v_{14}K = 3K\Delta v \tag{5}$$

In the above formulae, $v_{12}$ is the potential difference between the conducting wire 31-1 and the conducting wire 31-2, $v_{13}$ is the potential difference between the conducting wire 31-1 and the conducting wire 31-3, $v_{14}$ is the potential difference between the conducting wire 31-1 and the conducting wire 31-4, and $\Delta v$ is the amount of change in the potential between parts of the conducting wire 31 adjacent in the inside-outside direction S. Further, K is expressed by Formula (6).

[Math 2]

$$K = \frac{1}{C_c\left(\frac{1}{C_a} + \frac{1}{C_b} + \frac{1}{C_c} + \frac{1}{C_d} + \frac{1}{C_e}\right)d} \tag{6}$$

Based on the above, the electric field $E_c$ at the gap 50 when n=2 and k=1 is expressed by Formula (7).

$$E_c = E_{c12} + E_{c13} + E_{c14} = 6K\Delta v \tag{7}$$

Figure 5B:
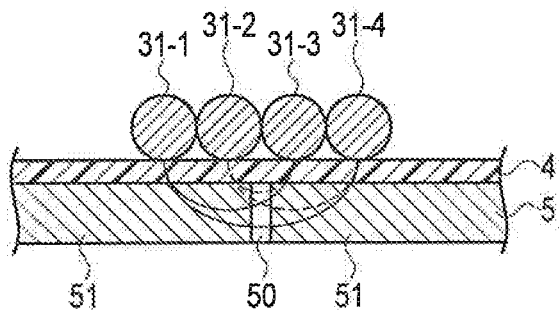
FIG. 5B is a sectional view seen in the extending direction of the conducting wire, the view illustrating an electric field at a gap between magnetic plates in a case where n=2 and k=2.

Next, a description is given of the electric field $E_c$ at the gap 50 when n=2 and k=2 as illustrated in FIG. 5B. As illustrated in FIG. 5B, an electric line of force passing through the gap 50 is generated between the conducting wire 31-1 and each of the conducting wire 31-3 and the conducting wire 31-4 and between the conducting wire 31-2 and each of the conducting wire 31-3 and the conducting wire 31-4.

Electric fields at the gap 50, namely the electric field $E_{c13}$ by the conducting wire 31-1 and the conducting wire 31-3, the electric field $E_{c14}$ by the conducting wire 31-1 and the conducting wire 31-4, an electric field $E_{c23}$ by the conducting wire 31-2 and the conducting wire 31-3, and an electric field $E_{c24}$ by the conducting wire 31-2 and the conducting wire 31-4, are expressed as Formulae (8) to (11), respectively.

$$E_{13}=v_{13}K=2K\Delta v \quad (8)$$

$$E_{c14}=v_{14}K=3K\Delta v \quad (9)$$

$$E_{c23}=v_{23}K=K\Delta v \quad (10)$$

$$E_{c24}=v_{24}K=2K\Delta v \quad (11)$$

Based on the above, the electric field $E_c$ at the gap 50 when n=2 and k=2 is expressed by Formula (12).

$$E_c=E_{c13}+E_{c14}+E_{c23}+E_{c24}=8K\Delta v \quad (12)$$

Figure 6A:
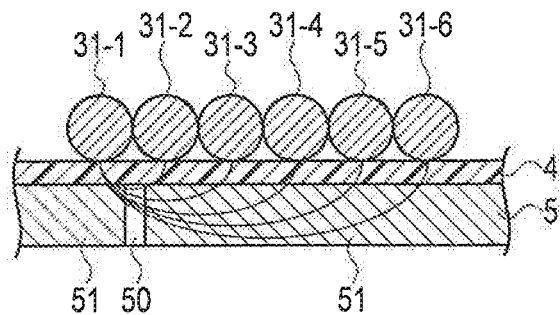
FIG. 6A is a sectional view seen in the extending direction of the conducting wire, the view illustrating an electric field at a gap between magnetic plates in a case where n=3 and k=1.
Figure 6B:
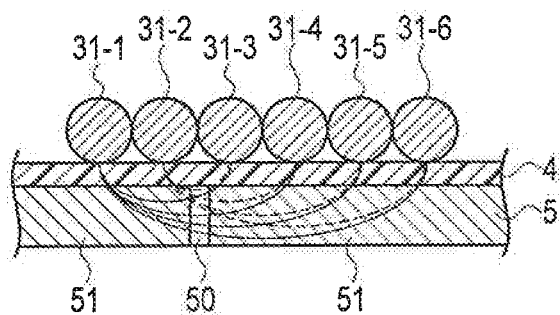
FIG. 6B is a sectional view seen in the extending direction of the conducting wire, the view illustrating an electric field at a gap between magnetic plates in a case where n=3 and k=2.
Figure 6C:
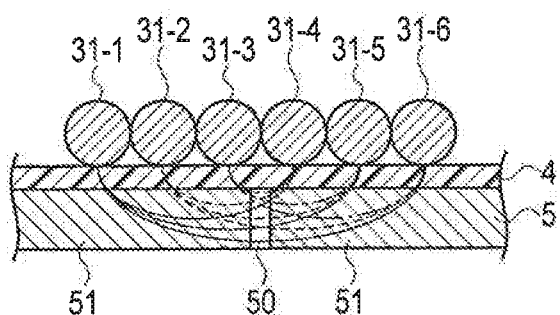
FIG. 6C is a sectional view seen in the extending direction of the conducting wire, the view illustrating an electric field at a gap between magnetic plates in a case where n=3 and k=3.

Similarly, a description is given of the electric field $E_c$ at the gap 50 when n=3 (the number of turns of the coil 3 is six), and k=1, as illustrated in FIG. 6A. In this case, the electric field $E_c$ by parts of the conductive wire 31 located on both sides of the gap 50 is 15K$\Delta$v. When n=3 and k=2 as illustrated in FIG. 6B, the electric field $E_c$ at the gap 50 is 24K$\Delta$v. When n=3 and k=3 as illustrated in FIG. 6C, the electric field $E_c$ at the gap 50 is 27K$\Delta$v.

When the number of turns of the coil 3 is 2n and the position of the gap 50 is k, the electric field $E_c$ applied to the gap 50 is expressed as Formula (13).

$$E_c=nk(2n-k)K\Delta v \quad (13)$$

Figure 7:
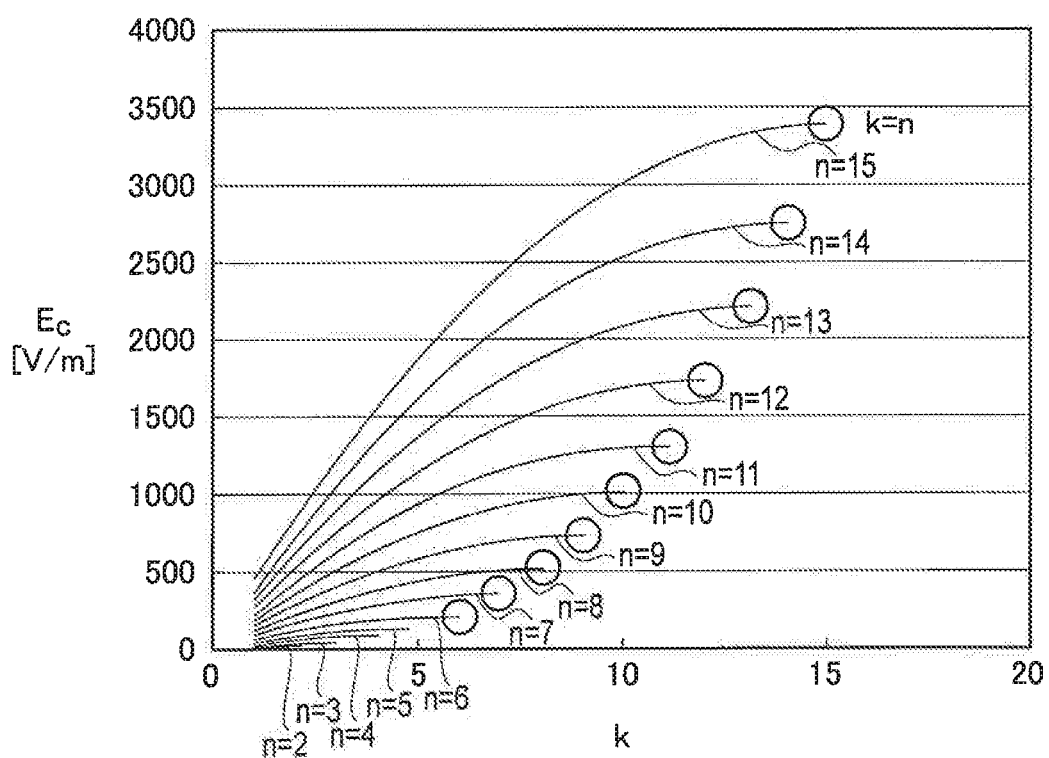
FIG. 7 is a diagram illustrating, for each n, the relation between the position of a gap between the magnetic plates and an electric field.

FIG. 7 is a diagram illustrating examples of the electric field $E_c$ at the gap 50 with respect to k in coil units having coils 3 where n is 2 to 15, the diagram illustrating relative values calculated with the potential difference between adjacent litz lines being IV and the combined capacitance of an equivalent circuit being 1. Each electric field $E_c$ monotonically increases with k, and as expressed in Formula (14), reaches the maximum value $E_{max}$ when n=k.

$$E_c=n^3K\Delta v \quad (14)$$

In this way, when the gap 50 extending in the extending direction T of the conducting wire 31 overlaps with the coil 3 in a view along the coil axis O, the electric field $E_c$ at the gap 50 is at substantially the maximum in the center of the coil 3 in the inside-outside direction S. In other words, the gap 50 is more likely to experience dielectric breakdown when the gap 50 is closer to the center of the coil 3 in the inside-outside direction S. Thus, when the gaps 50 overlap with the coil 3 in a view along the coil axis O, the gaps 50 extending in the extending direction T of the conducting wire 31 are located in regions near the edge portions 3E of the coil 3, not the center part in the inside-outside direction S.

Figure 8:
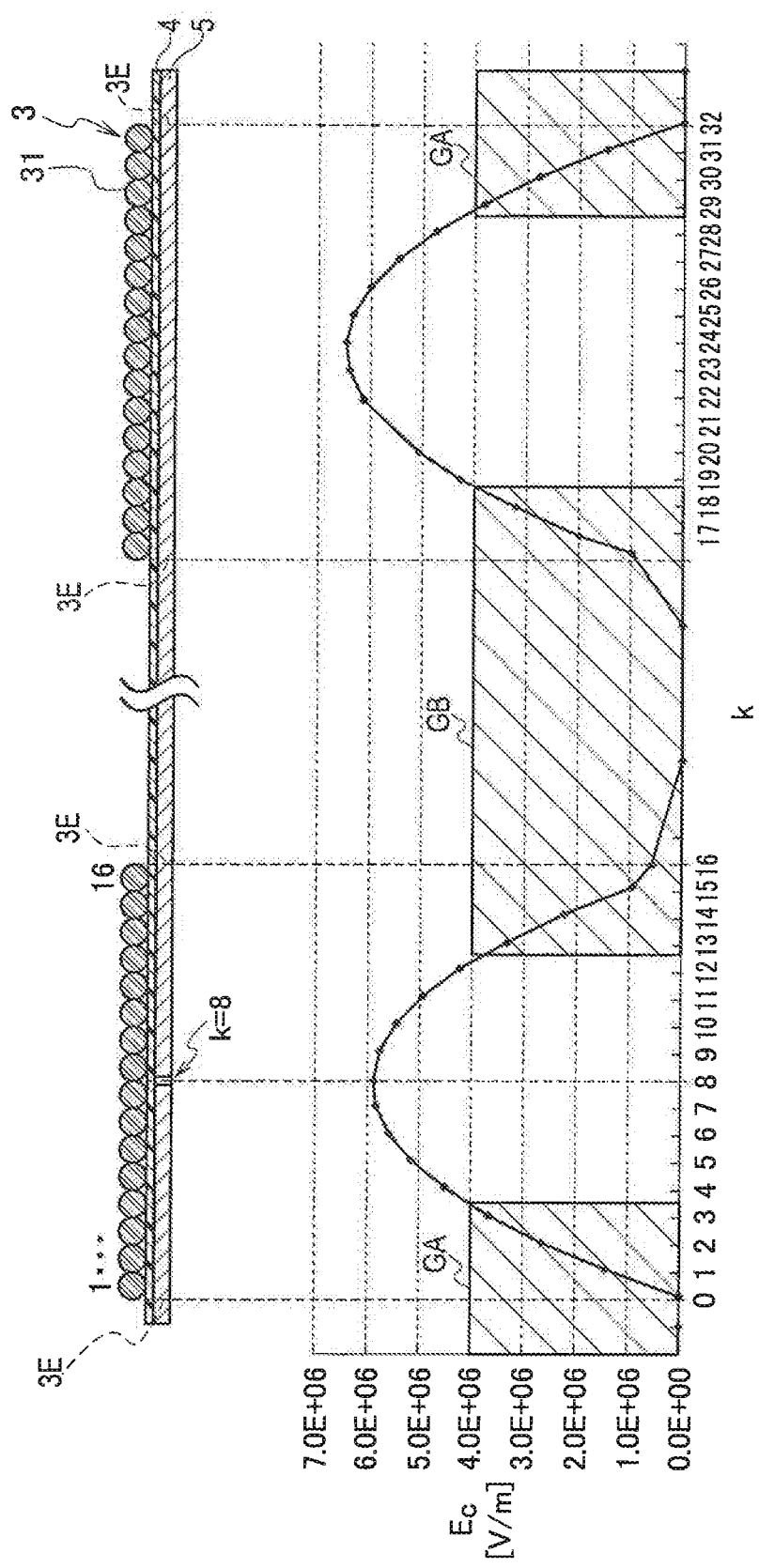
FIG. 8 illustrates an example of the relation between the position of a gap between the magnetic plates and an electric field for the entire region of the coil.

FIG. 8 is a diagram illustrating the electric field $E_c$ at the gap 50 for each k in a coil unit having the coil 3 with n=8 (16 turns) under a predetermined condition (results of calculations using a simplified model corresponding to 6 kW excitation). What is meant by k=0 to 16 is that the gap 50 is located between the outer edge portion 3E and the inner edge portion 3E in the inside-outside direction S. What is meant by k=17 to 32 is that the gap 50 is located between the outer edge portion 3E and the inner edge portion 3E in the inside-outside direction S on the opposite side of the coil axis O.

Since the electric field where electric discharge occurs due to Paschen's Law is generally said to be 4 MV/m, the gap 50 needs to be formed at a position where the electric field $E_c$ is substantially below 4 MV/m. In FIG. 8, GA and GB indicate regions where the electric field $E_e$ is below 4 MV/m. Parts of the regions GA and GB that overlap with the coil 3 are substantially approximately 35% from each of the edge portions 3E toward the center of the coil 3 in the inside-outside direction S. Herein, "near the edge portions 3E" refer to regions which are substantially less than 35% from the edge portions 3E toward the center of the coil 3 in the inside-outside direction S.

Further, as illustrated in FIG. 8, the region GB located near the inner edge portion 3E in the inside-outside direction S tends to have a higher electric field than the region GA. This is because of the influence by the potential of the conducting wire 31 on the side opposite from each other. As illustrated in FIG. 2A and the like, among the gaps 50 extending in the two axis directions orthogonal to each other (the X axis direction and the Y axis direction), a total of four gaps 50 located at outermost positions on each side are located near the outer edge portion 3E of the coil 3 in the inside-outside direction S. Thus, compared to being located near the inner edge portion 3E of the coil 3 in the inside-outside direction S, the gap 50 can reduce the influence by the conducting wire 31 on the opposite side.

Figure 9:
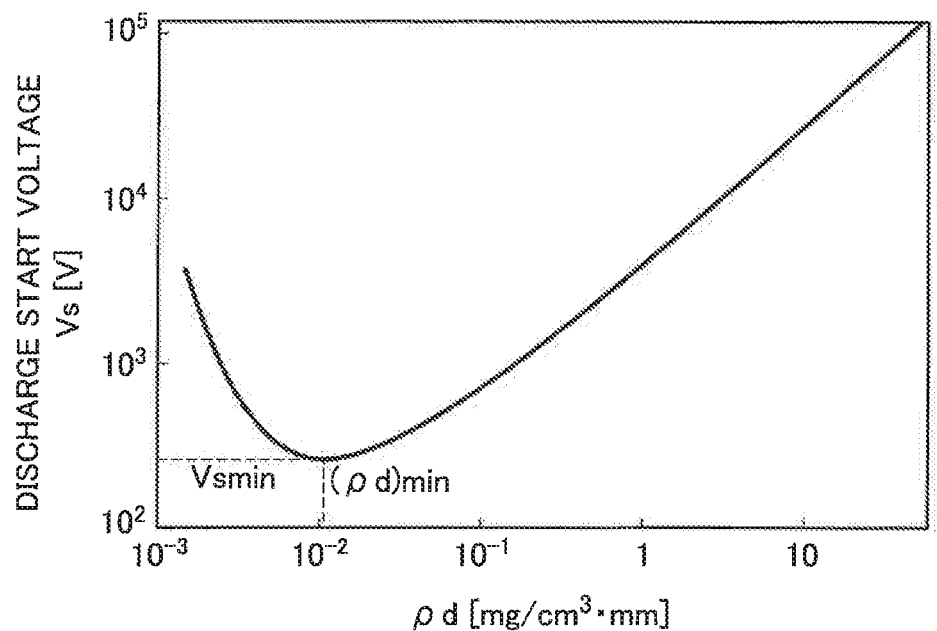
FIG. 9 illustrates an example of a Paschen curve.

FIG. 9 shows a Paschen curve illustrating the relation between a discharge start voltage Vs and the product of the clearance d of the gap 50 and atmospheric pressure ρ. When the clearance d is increased with the atmospheric pressure ρ constant, the discharge start voltage Vs reach its minimum value Vsmin at a given clearance d. Hence, the clearance d needs to be designed so that the discharge start voltage Vs may not reach a value near the minimum value Vsmin.

Figure 10:
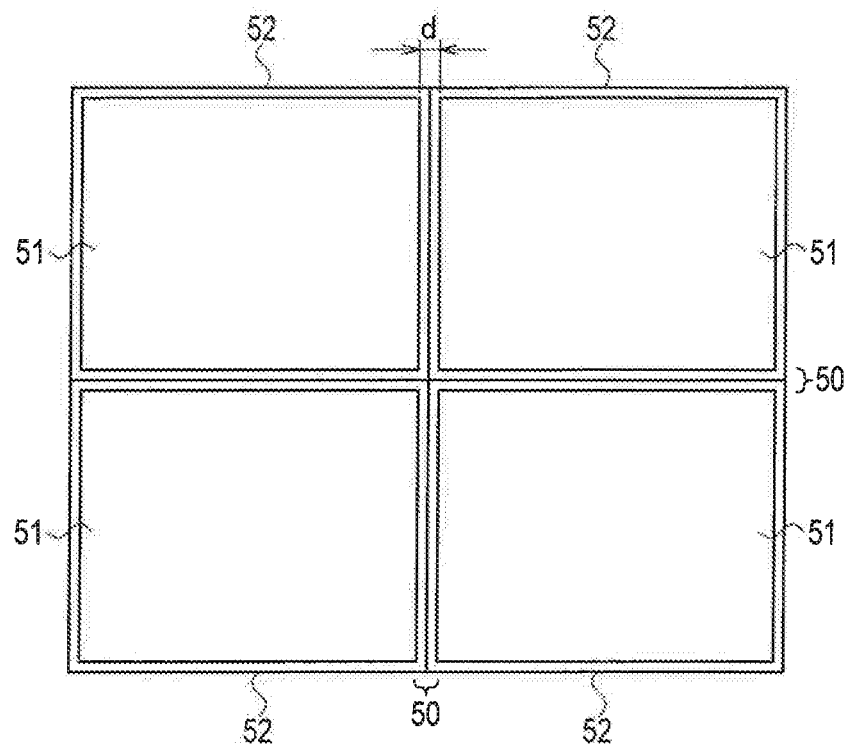
FIG. 10 is a plan view illustrating gaps between the magnetic plates having coatings formed on the surfaces thereof.

As illustrated in FIG. 10, the magnetic plates 51 each may have a coating 52 formed on its surface. The coating 52 is made of, for example, a non-metallic material such as a resin, and is formed to prevent the magnetic plate 51 from cracking. The magnetic plates 51 on each of which the coating 52 is formed are fixed by, for example, the tray accommodating the magnetic core 5 so that their sides may be in contact with one another.

In this case, the clearance d is defined as a distance between the magnetic plates 51, i.e., approximately twice the thickness of the coating 52. The discharge start voltage (dielectric breakdown start voltage) Vs in this case is determined by, for example, the material of the coating 52 and the clearance d, or by experiment.

As described above, according to the coil unit according to the first embodiment, the gaps 50 are formed at positions corresponding to the regions GA and GB near the edge portions 3E, which are not regions where the electric field may cause dielectric breakdown. Thus, according to the coil unit according to the first embodiment, the gaps 50 are formed at positions where the electric field strength is relatively low, and thereby the potential difference between the magnetic plates 51 can be reduced, lowering the risk of dielectric breakdown between the magnetic plates 51.

Further, according to the coil unit according to the first embodiment, the gaps 50 overlapping with the coil 3 in a view along the coil axis O are located near the outer edge portion 3E of the coil 3 in the inside-outside direction S. Thus, compared to when the gaps 50 are located near the inner edge portion 3E of the coil 3 in the inside-outside direction S, the coil unit according to the first embodiment can reduce the influence by the conducting wire 31 on the opposite side and reduce the electric field $E_c$ at the gap 50.

In addition, the coil unit according to the first embodiment has the gaps 50 that traverse the coil 3 in the inside-outside direction S in a view along the coil axis O. The gaps 50 that traverse the inside-outside direction S of the coil 3 are less likely to be affected by the potential at the conducting wire 31, and are therefore relatively unlikely to be under the risk of dielectric breakdown. Thus, the coil unit according to the first embodiment can reduce the risk of dielectric breakdown between the magnetic plates 51.

(First Modification)

Figure 11A:
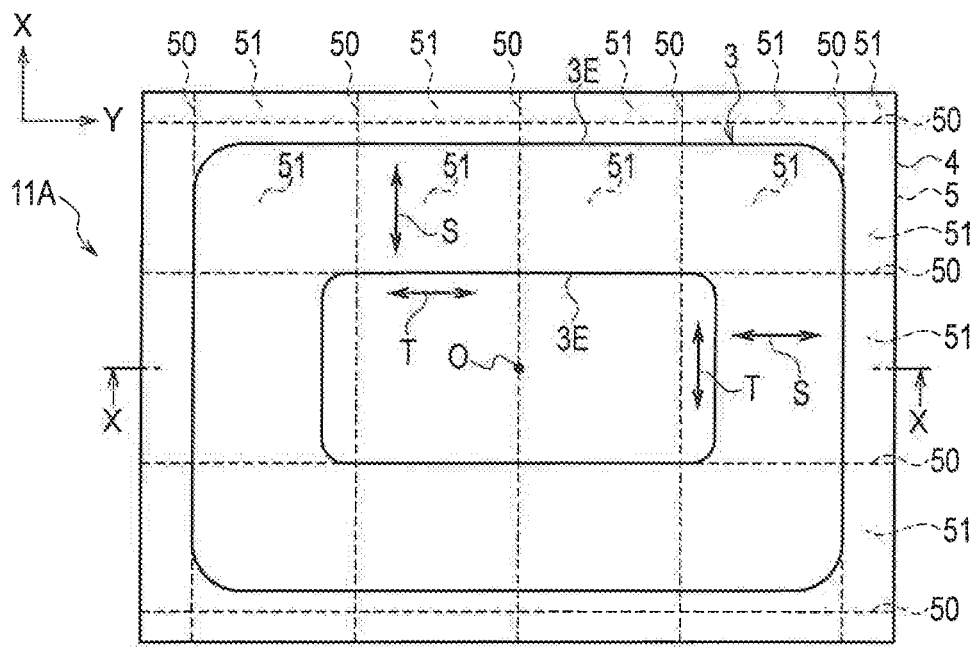
FIG. 11A is a plan view illustrating a coil unit according to a first modification of the first embodiment.
Figure 11B:
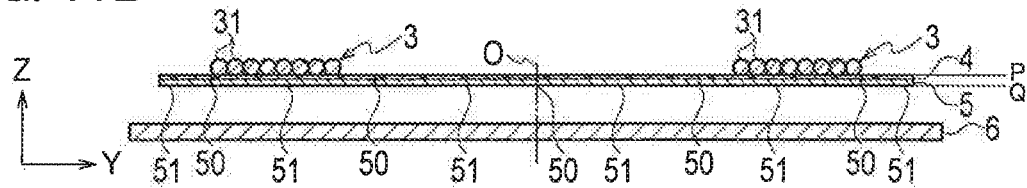
FIG. 11B is a sectional view seen in the direction of X-X in FIG. 11A.

FIGS. 11A and 11B are diagrams illustrating a ground-side coil unit 11A which is a coil unit according to a first modification of the first embodiment. In the ground-side coil unit 11A, out of the gaps 50 extending in the Y axis direction, two gaps 50 located at the outermost positions are located outside the coil 3 in the inside-outside direction S in a view along the coil axis O.

Further, out of the gaps 50 extending in the Y axis direction, two gaps 50 located at the inner sides overlap with the inner edge portion 3E of the coil 3 in a view along the coil axis O. Out of the gaps 50 extending in the X axis direction, two gaps 50 located at the outermost positions overlap with the outer edge portion 3E of the coil 3 in a view along the coil axis O.

As illustrated in FIG. 8, when the gap 50 is located outside the coil 3, the electric field $E_c$ is low compared to a region where the gap 50 overlaps with the coil 3. Further, when the gap 50 overlaps with the edge portion 3E of the coil 3, the electric field $E_c$ is low compared to other regions where the gap 50 overlaps with the coil 3. Thus, the gap 50 may be formed to be located outside the coil 3 in a view along the coil axis O, and may be formed to overlap with the edge portion 3E of the coil 3 in a view along the coil axis O.

(Second Modification)

Figure 12:
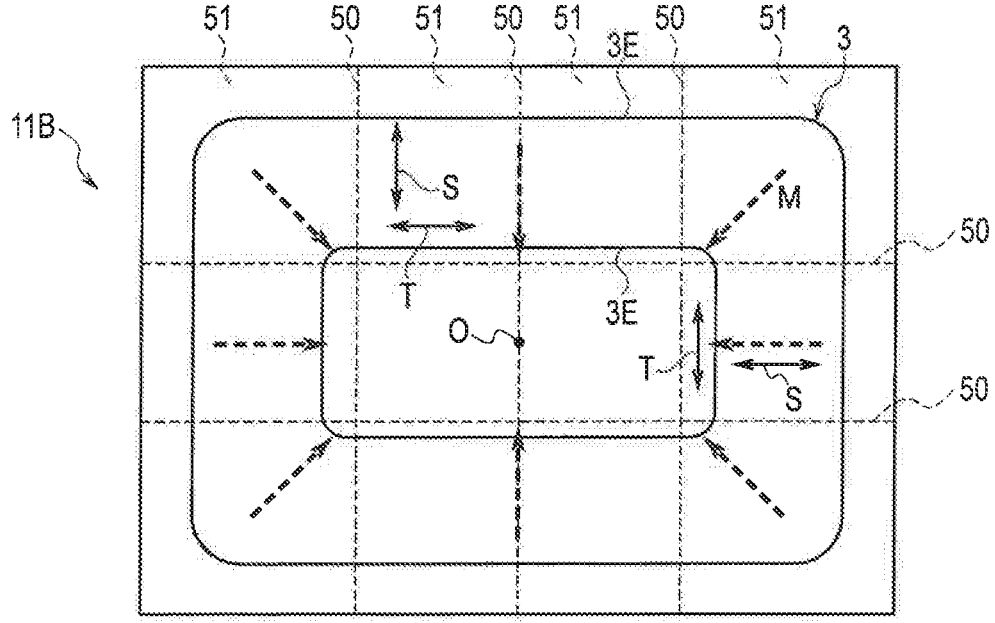
FIG. 12 is a plan view illustrating a coil unit according to a second modification of the first embodiment.

FIG. 12 is a diagram illustrating a ground-side coil unit 11B which is a coil unit according to a second modification of the first embodiment. In the magnetic core 5 of the ground-side coil unit 11B, regions corresponding to the four curved portions (corner portions) of the substantially rectangular coil 3 are each formed by a single magnetic plate 51. In other words, the gap 50 are formed in regions of the coil 3 except for the four curved portions in a view along the coil axis O. The conducting wire 31 extends with a curve in the curved portions of the coil 3, and extends straight in portions other than the curved portions.

As illustrated in FIG. 12, in a view along the coil axis O, the magnetic flux M is formed substantially along the inside-outside-direction S. Similarly, an electric line of force formed by the conducting wire 31 is formed substantially along the inside-outside direction S. Although the definition of the direction of an electric line of force is complicated in each curved portion of the coil 3, an electric line of force for considering the electric field $E_c$ at the gap 50 is substantially the inside-outside direction S orthogonal to the extending direction T of the conducting wire 31. Thus, using a single magnetic plate 51 in each curved portion of the coil 3 facilitates the definition of the direction of the electric line of force and therefore facilitates the designing of the electric field $E_c$.

(Third Modification)

Figure 13A:
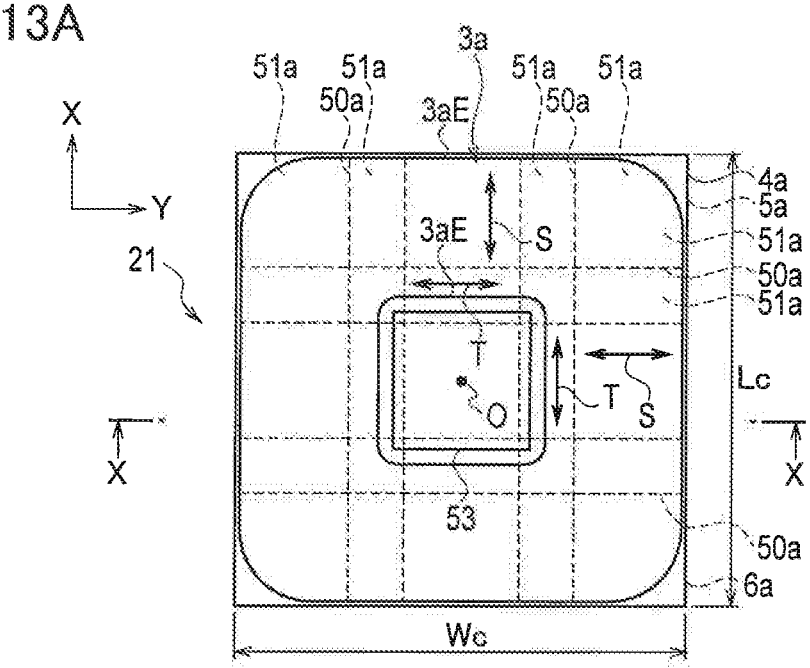
FIG. 13A is a plan view illustrating a coil unit according to a third modification of the first embodiment.
Figure 13B:
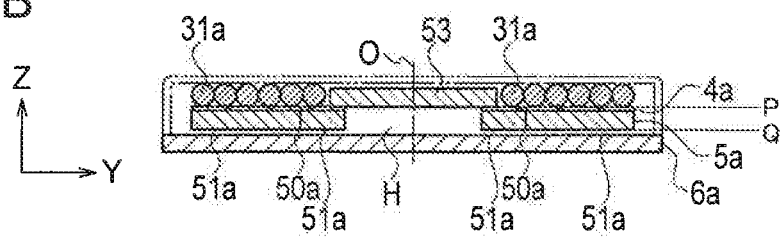
FIG. 13B is a sectional view seen in the direction of X-X in FIG. 13A.

FIGS. 13A and 13B are diagrams illustrating the vehicle-side coil unit 21 which is a coil unit according to a third modification of the first embodiment. The coil unit according to the first embodiment can thus be applied to the vehicle-side coil unit 21 illustrated in FIG. 1, as well. The following describes a state where a magnetic core 5a is located below a coil 3a as illustrated in FIG. 13B, but when actually installed in the vehicle 20, the vehicle-side coil unit 21 is inverted upside down (in the Y axis direction) from the state illustrated in FIG. 13B.

The vehicle-side coil unit 21 includes the coil 3a having the coil axis O along the vertical direction, an insulating layer 4a, the magnetic core 5a, a base plate 6a, and a cover 7a. Other configurations, operations, and advantageous effects not described below concerning the coil 3a, the insulating layer 4a, the magnetic core 5a, the base plate 6a, and the cover 7a are substantially the same as the coil 3, the insulating layer 4, the magnetic core 5, the base plate 6, and the cover 7 described above.

As illustrated in FIGS. 13A and 13B, the coil 3a is formed of a conducting wire 31a arranged on the first plane P and laid side by side with itself in the inside-outside direction S with the coil axis O normal to the first plane P as the center. The conducting wire 31a is wound round and round a plurality of times in a square shape in a view along the coil axis O and thus occupies a substantially square annular region.

The magnetic core 5a includes a plurality of magnetic plates 51a arranged in a square annular region on the second plane Q except for a space H which is the center part in a view along the coil axis O and a magnetic, plate 53 disposed to clog the space H from above the magnetic plates 51a. The magnetic plates 51 and the magnetic plate 53 are each shaped like a rectangular plate. The magnetic plates 51a enclose the coil 3a in a view along the coil axis O. The magnetic plate 53 is disposed at the inner side of the coil 3a with a space from the coil 3a. The insulating layer 4a insulates the coil 3a and the magnetic plates 51a from each other.

Gaps 50a between the magnetic plates 51a extend on the second plane Q in two axis directions orthogonal to each other (the X axis direction and the Y axis direction). The magnetic plates 51a are arranged so that the gaps 50a extending in the extending direction T of the conducting wire 31a may be located near edge portions 3aE of the coil 3a in the inside-outside direction S. In other words, the gaps 50a which are formed by the magnetic plates 51a and traverse the inside-outside direction S of the coil 3a are located near the edge portions 3aE of the coil 3a in the inside-outside direction S.

The space H formed by the magnetic plates 51a and the magnetic plate 53 accommodates, for example, a resonant circuit on the power receiving side including a capacitor and the like. The vehicle 20 has a limited space to accommodate a resonant circuit and the like, but can make effective use of space when the space H functions as a space for accommodating the circuit.

Second Embodiment

Figure 14:
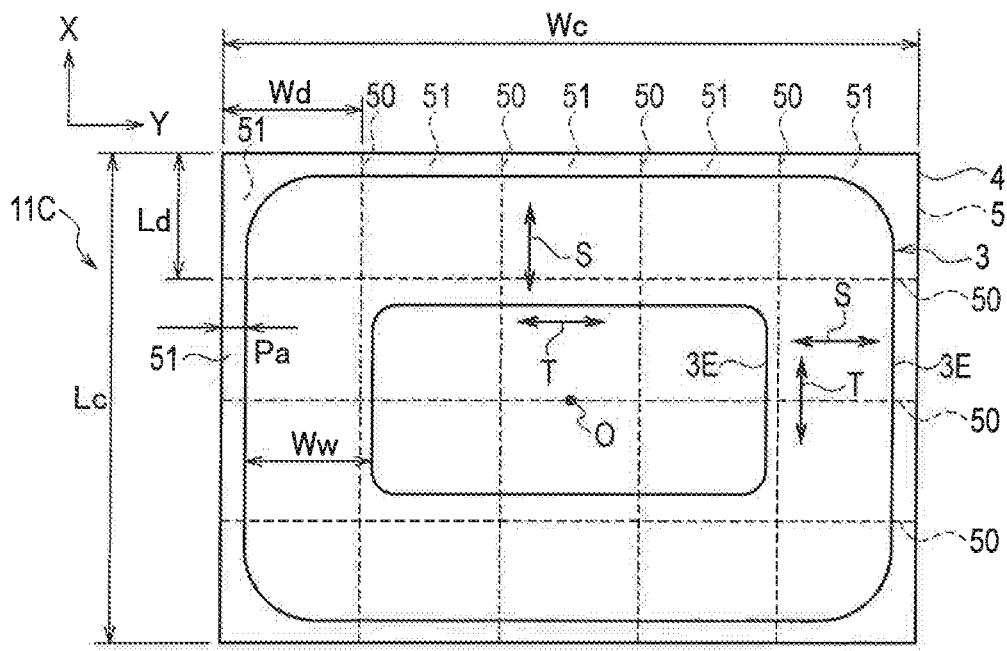
FIG. 14 is a plan view illustrating a coil unit according to a second embodiment.

A ground-side coil unit 11C which is a coil unit according to a second embodiment differs from the first embodiment in that, as illustrated in FIG. 14, the magnetic plates 51 have the same dimension as one another Other configurations, operations, and advantageous effects not described in the second embodiment are substantially the same as those in the first embodiment.

The magnetic core 5 has a length Lc and a width Wc. In the example illustrated in FIG. 14, a length Ld of each magnetic plate 51 is Lc/4, and a width Wd of each magnetic plate 51 is Wc/5. In this way, the magnetic plates 51 of the ground-side coil unit 11C have the same dimension as one another. Thus, only one type of mold is needed to manufacture the magnetic plates 51, which can simplify manufacturing processes and reduce manufacturing costs.

The dimension of each magnetic plate 51 in the inside-outside direction S is similar to the sum of a distance Pa from the outermost circumferential portion of the magnetic plates 51, i.e., the outer circumferential edge of the magnetic core 5, to the outer edge portion 3E of the coil 3 and the width Ww of the coil 3 in the inside-outside direction S. In other words, as illustrated in FIG. 14, in the Y axis direction for example, the width Wd of the magnetic plate 51 is similar to the sum of the distance Pa from the outer circumferential edge of the magnetic core 5 to the outer edge portion 3E of the coil 3 and the width Ww of the coil 3 in the inside-outside direction S.

Thus, the total of four gaps 50 located on the outermost sides are located near the inner edge portion 3E of the coil 3 in the inside-outside direction S. In other words, the dimension of the magnetic plate 51 in the inside-outside direction S being similar to the sum of the distance Pa and the width Ww means that the gaps 50 which are along the outer circumferential edge of the magnetic core 5 and closest to the outer circumferential edge of the magnetic core 5 are located near the inner edge portion 3E of the coil 3.

According to the coil unit according to the second embodiment as described above, the dimension of the magnetic plate 51 in the inside-outside direction S is similar to the sum of the distance Pa and the width Ww, and consequently the positions of the gaps 50 can be easily managed. Thus, the coil unit according to the second embodiment can reduce the potential difference between the magnetic plates 51 and lower the risk of dielectric breakdown between the magnetic plates 51.

Further, according to the coil unit according to the second embodiment, the magnetic plates 51 have the same dimension as each other, which can simplify manufacturing processes and reduce manufacturing costs.

(Modification)

Figure 15:
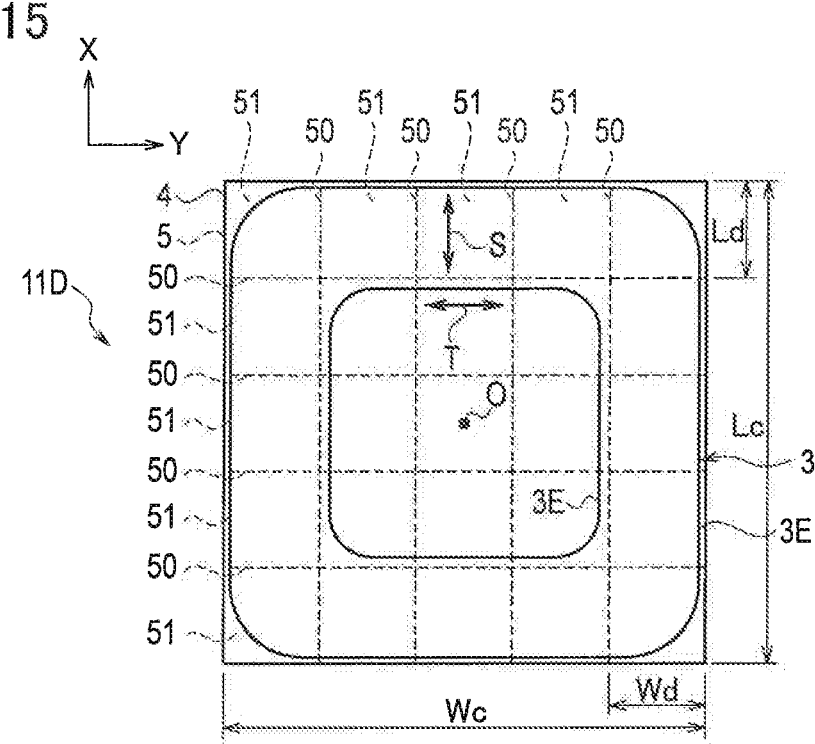
FIG. 15 is a plan view illustrating a coil unit according to a modification of the second embodiment.

FIG. 15 is a diagram illustrating a ground-side coil unit 11D which is a coil unit according to a modification of the second embodiment. The ground-side coil unit 11D differs from the above-described ground-side coil unit 11C in being square-shaped in a view along the coil axis O.

The magnetic core 5 has the length Lc and the width Wc, and Lc=Wc. In the example illustrated in FIG. 15, the length Ld of each magnetic plate 51 is Lc/5, and the width Wd of each magnetic plate 51 is Wc/5. Thus, the magnetic plates 51 have the same dimension as one another Also in this case, the dimension of the magnetic plate 51 in the inside-outside direction S is similar to the sum of the distance Pa and the width Ww, which can facilitate positional management of the gap 50 and reduce the potential difference between the magnetic plates 51 to lower the risk of dielectric breakdown between the magnetic plates 51.

Third Embodiment

Figure 16:
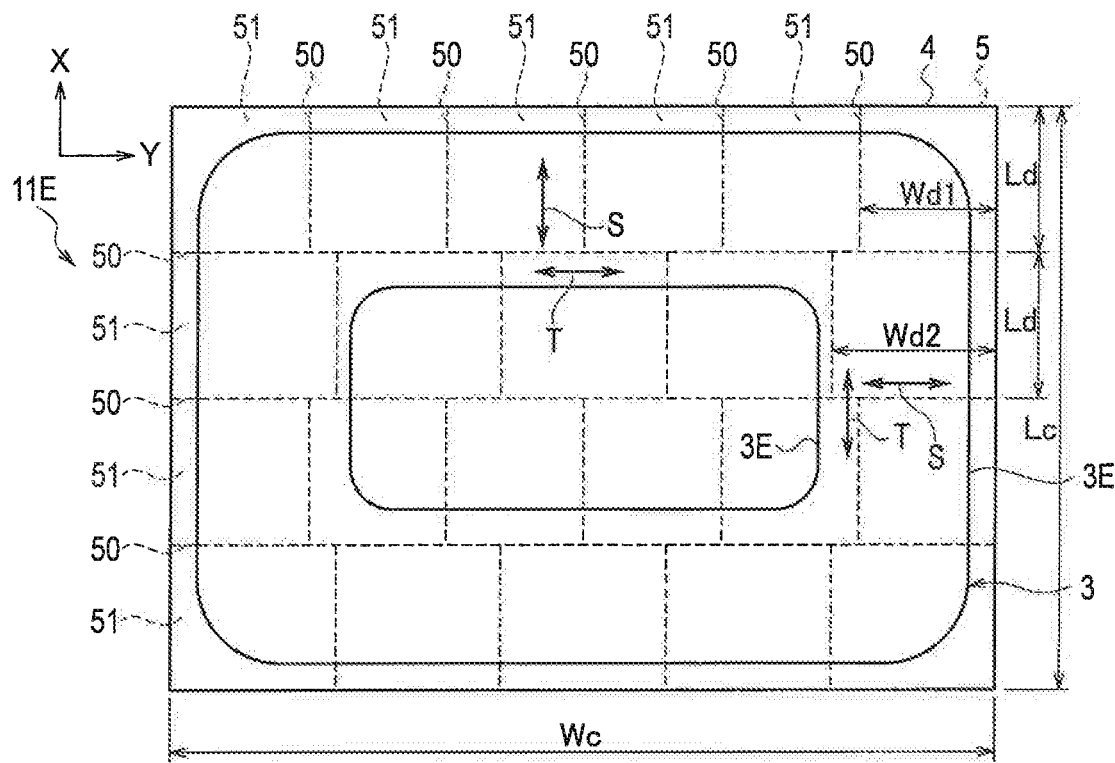
FIG. 16 is a plan view illustrating a coil unit according to a third embodiment.

A ground-side coil unit 11E which is a coil unit according to a third embodiment differs from the first and second embodiments in that, as illustrated in FIG. 16, corner portions of each four magnetic plates 51 are not concentrated in one location. Other configurations, operations, and advantageous effects not described in the third embodiment are substantially the same as those in the first and second embodiments.

The magnetic plates 51 are formed by, for example, odd-numbered two rows of the magnetic plates 51 and even-numbered two rows of the magnetic plates 51 from one end side in the X axis direction. In the example illustrated in FIG. 16, the magnetic plates 51 in the odd-numbered rows have the same dimension as one another, and each have the length Ld=Lc/4 and a width Wd1=Wc/6. The magnetic plates 51 in the even-numbered rows have the same dimension as one another, and each have the length Ld=Lc/4 and a width Wd2=Wc/5.

In other words, the dimension Wd1 of each magnetic plate 51 in the Y axis direction in the odd-numbered rows and the dimension Wd2 of each magnetic plate 51 in the Y axis direction in the even numbered rows are the quotients of the dimension Wc of the magnetic core 5 in the Y axis direction divided by respective integers whose difference from each other is one. Thus, the gaps 50 extending in the X axis direction are staggered in the X axis direction.

Further, Ld, Wd1, and Wd2 are each similar to the sum of the distance Pa from the outer circumferential edge of the magnetic core 5 to the outer edge portion 3E of the coil 3 and the width Ww of the coil 3 in the inside-outside direction S. The integers by which to divide the length Lc and the width Wc of the magnetic core 5 are determined to satisfy this condition. Thereby, the gaps 50 which are along the outer circumferential edge of the magnetic core 5 and closest to the outer circumferential edge of the magnetic core 5 are located near the inner edge portion 3E of the coil 3.

Figure 17A:
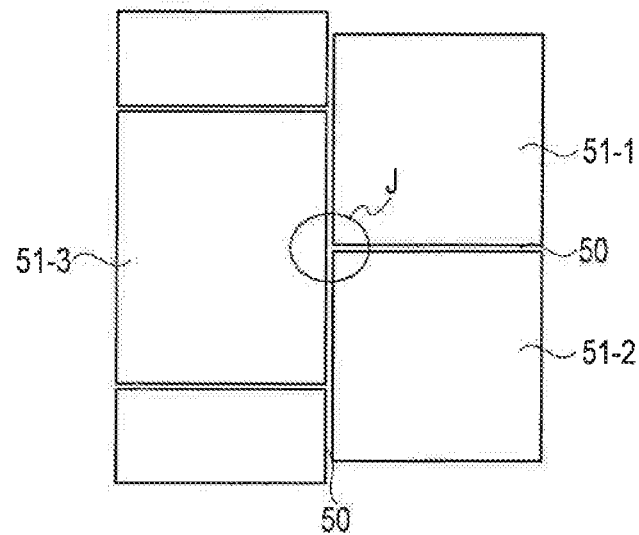
FIG. 17A is an enlarged plan view of magnetic plates corresponding to FIG. 16.

As illustrated in FIG. 17A, the magnetic plates 51 are arranged so that at a point J where two gaps 50 extending in two respective directions orthogonal to each other are in contact with each other, three magnetic plates 51-1 to 51-3 are in contact with one another. The magnetic plates 51-1 to 51-3 are three adjacent magnetic plates 51 among the magnetic plates 51. The magnetic plates 51-1 and the magnetic plates 51-2 are adjacent to the magnetic plate 51-3 in the X axis direction. In other words, the magnetic plates 51 are arranged so that one corner portion of the magnetic plate 51-1 and one corner portion of the magnetic plate 51-2 are in contact with each other on one side of the magnetic plate 51-3.

Figure 17B:
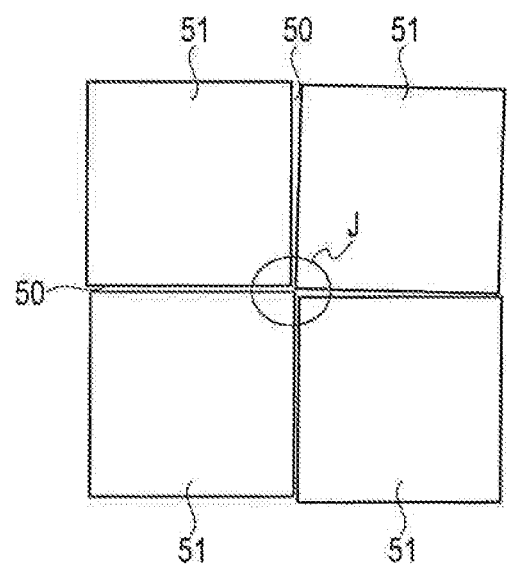
FIG. 17B is an enlarged plan view of magnetic plates for comparison with FIG. 17A.

On the other hand, it may be difficult to manage the clearance d of the gaps 50 when, as illustrated in FIG. 17B, four magnetic plates 51 are arranged so that their corner portions are in contact with each other at a point J where two gaps 50 are orthogonal to each other. Further, when corner portions of four magnetic plates 51 are concentrated, electric field concentration may occur.

The coil unit according to the third embodiment can facilitate management of the clearance d of the gaps 50 and reduce electric field concentration at the corner portions of the magnetic plates 51. Thus, the coil unit according to the third embodiment can reduce the potential difference between the magnetic plates 51 and lower the risk of dielectric breakdown between the magnetic plates 51.

Fourth Embodiment

Figure 18A:
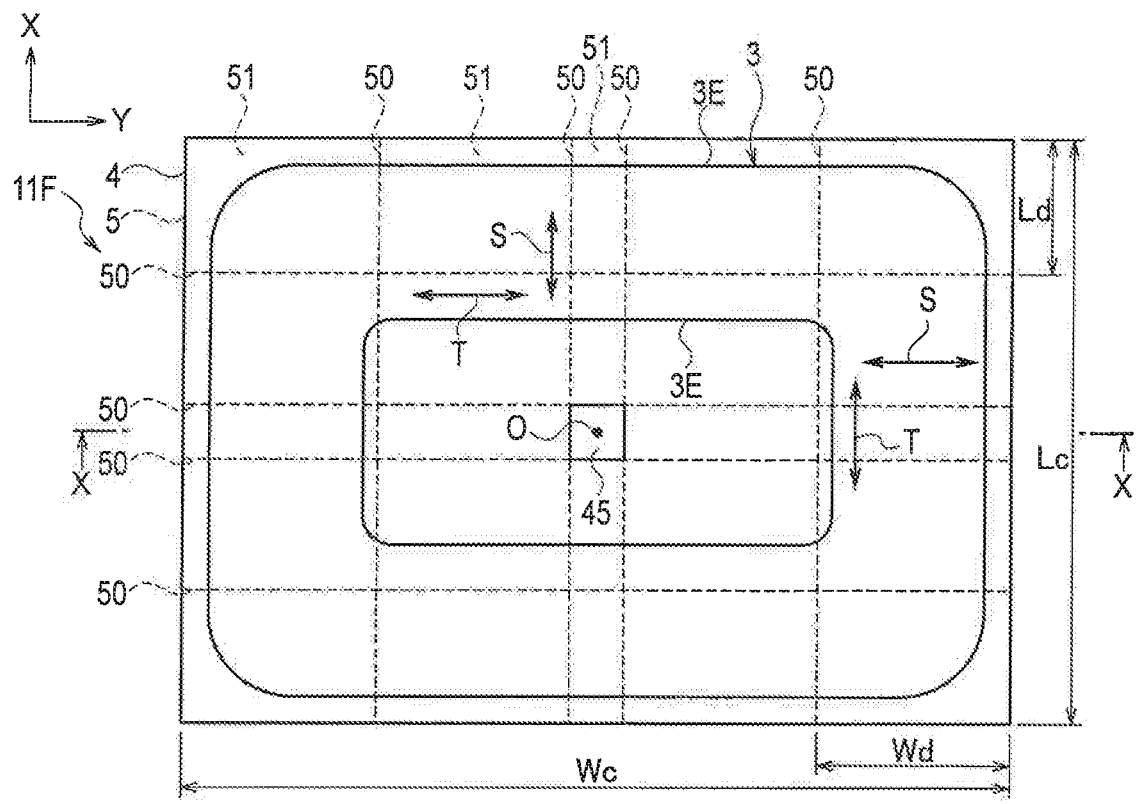
FIG. 18A is a plan view illustrating a coil unit according to a fourth embodiment.
Figure 18B:
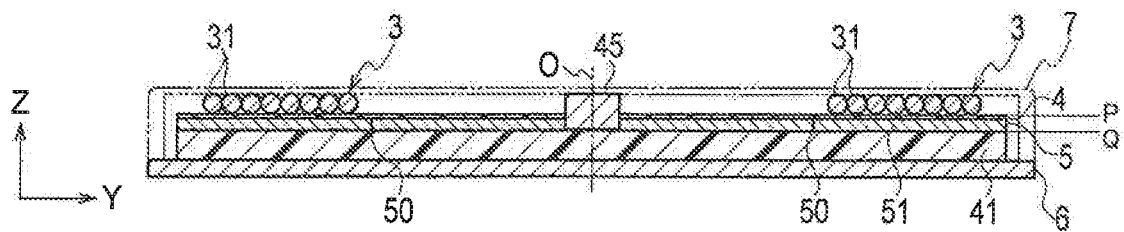
FIG. 18B is a sectional view seen in the direction of X-X in FIG. 18A.

A ground-side coil unit 11F which is a coil unit according to a fourth embodiment differs from the first to third embodiments in including, as illustrated in FIGS. 18A and 18B, a support column 45 that supports the cover 7. Other configurations, operations, and advantageous effects not described in the fourth embodiment are substantially the same as those in the first to third embodiments.

As illustrated in FIG. 18B, the ground-side coil unit 11F includes an insulating layer 41 that is disposed on the base plate 6 and supports the magnetic core 5. The insulating layer 41 is a rectangular plate made of, for example, a resin material, and has substantially the same pattern as the magnetic core 5 in a plan view. The insulating layer 41 supports the lower surface of the support column 45 with a center portion of the upper surface thereof.

Thus, the magnetic core 5 and the insulating layer 4 have a rectangular through-hole in a center portion in a view along the coil axis O, the through-hole penetrating from the upper surface to the lower surface. In a view along the coil axis O, the through-hole in the magnetic core 5 and the support column 45 have substantially the same shape. The support column 45 is disposed in such a manner as to be in contact with the upper surface of the insulating layer 41 and the lower surface of the cover 7 through the through-hole in the magnetic core 5. The support column 45 is disposed so that, for example, the coil axis O may coincide with the center thereof.

The magnetic core 5 has gaps 50 formed to extend in the X axis direction and in the Y axis direction from the four sides of the rectangular through-hole. In other words, when Wh is a dimension in the X axis direction of the through-hole in the magnetic core 5 and Lh is a dimension in the Y axis direction of the through-hole in the magnetic core 5, the magnetic plates 51 have magnetic plates 51 with a length Lh and magnetic plates 51 with a width Wh in the Y axis direction and in the X axis direction of the support column 45, respectively.

Ld and Wd are the length and the width, respectively, of each magnetic plate 51 other than the magnetic plates 51 having the length Lh and the magnetic plates 51 having the width Wh. Ld is the quotient of (Lc−Lh)/2 divided by an integer. Wd is the quotient of (Wc−Wh)/2 divided by an integer. Ld and Wd are each similar the sum of the distance Pa from the outer circumferential edge of the magnetic core 5 to the outer edge portion 3E of the coil 3 and the width Ww of the coil 3 in the inside-outside direction S. Ld and Wd are each determined so as to satisfy this condition. Thereby, the gaps 50 which are along the outer circumferential edge of the magnetic core 5 and closest to the outer circumferential edge of the magnetic core 5 are located near the inner edge portion 3E of the coil 3.

According to the coil unit according to the fourth embodiment, the support column 45 disposed to coincide with the coil axis O can improve the mechanical strength. The ground-side coil unit 11F may be stepped on by the vehicle 20, but by including the support column 45, the ground-side coil unit 11F can have a reduced possibility of getting broken.

Further, the coil unit according to the fourth embodiment includes, at the outer circumferential edge of the magnetic core 5, the magnetic plates 51 having a dimension in the inside-outside direction S similar to the sum of the distance Pa and the width Ww, and thereby facilitates positional management of the gaps 50. Thus, the coil unit according to the fourth embodiment can reduce the potential difference between the magnetic plates 51 and lower the risk of dielectric breakdown between the magnetic plates 51.

Other Embodiments

Although the embodiments of the present invention have been described above, descriptions and the drawings that constitute part of the present disclosure should not be construed as limiting the present invention. From this disclosure, various alternative embodiments, examples, and operation techniques will be found by those skilled in the art.

For example, the coil 3 is shaped substantially like a rectangular annular in a view along the coil axis O in the first to fourth embodiments described above, but the shape of the coil 3 is not limited to this. For example, when the conducting wire 31 is laid side by side with itself in a direction orthogonal to the extending direction T, the direction of lying side by side corresponds to the inside-outside direction S. In this case, the magnetic plates 51 adjacent to the laid conducting wire 31 are arranged so as to form the gaps 50 which traverse the direction in which the conducting wire 31 is laid side by side with itself and which are located near the edge portion 3E of the coil 3.

It goes without saying that the present invention includes various other embodiments and the like not described herein, such as configurations obtained by applying the above-described configurations to each other. Accordingly, the technical scope of the present invention should be determined only by the matters to define the invention in the scope of claims regarded as appropriate based on the description.

REFERENCE SIGNS LIST 1 power supply apparatus
2 power receiving apparatus
3, 3a coil
3E, 3aE edge portion
11, 11A to 11F ground-side coil unit (coil unit)
21 vehicle-side coil unit (coil unit)
31, 31a conducting wire
50, 50a gap
51, 51a magnetic plate
51-1 magnetic plate (first magnetic plate)
51-2 magnetic plate (second magnetic plate)
51-3 magnetic plate (third magnetic plate)
O coil axis
P first plane
Q second plane
S inside-outside direction

The invention claimed is:

1. A coil unit for use for contactless power supply, the coil unit comprising:
a coil formed of a conducting wire arranged on a first plane and laid side by side with itself in an inside-outside direction with a coil axis normal to the first plane as a center; and
a plurality of magnetic plates arranged on a second plane which is along and adjacent to the first plane, wherein
a gap which is formed by the magnetic plates and traverses the inside-outside direction of the coil is located at a region where an electric field at the gap is below an electric field where electric discharge occurs from an edge portion of the coil in the inside-outside direction and overlaps with the coil.

2. The coil unit according to claim 1, wherein the gap is located at the region where the electric field at the gap is below an electric field where electric discharge occurs from an outer edge portion of the coil in the inside-outside direction.

3. The coil unit according to claim 1, wherein
the magnetic plates include a rectangular first magnetic plate, a rectangular second magnetic plate, and a rectangular third magnetic plate, and
the magnetic plates are arranged so that one corner portion of the first magnetic plate and one corner portion of the second magnetic plate are in contact with each other on one side of the third magnetic plate.

4. The coil unit according to claim 1, wherein
a dimension of each of the magnetic plates in the inside-outside direction is the same as a sum of a distance from an outermost circumferential portion of the magnetic plates to an outer edge portion of the coil and a width of the coil in the inside-outside direction.

5. The coil unit according to claim 1, further comprising a tray having a lid interposed between the coil and the plurality of magnetic plates.

6. The coil unit according to claim 5, wherein the lid comprises a resin.

7. The coil unit according to claim 1, wherein the plurality of magnetic plates includes a coating.

8. The coil unit according to claim 7, wherein the coating comprises a non-metallic material.

9. The coil unit according to claim 1, wherein the coil includes a coating.

10. The coil unit according to claim 1, wherein the gap extends on the second plane in two axis directions.

11. The coil unit according to claim 10, wherein the two axis directions are orthogonal to each other.

12. The coil unit according to claim 1, further comprising a base plate supporting the plurality of magnetic plates.

13. The coil unit according to claim 12, wherein the base plate comprises a metal that dissipates heat.

14. The coil unit according to claim 12, further comprising a cover that couples to the base plate with the coil and the plurality of magnetic plates contained within the cover and the base plate.

* * * * *